US010557719B2

(12) United States Patent
Goh et al.

(10) Patent No.: US 10,557,719 B2
(45) Date of Patent: Feb. 11, 2020

(54) GAS TURBINE SENSOR FAILURE DETECTION UTILIZING A SPARSE CODING METHODOLOGY

(71) Applicant: Siemens Energy, Inc., Orlando, FL (US)

(72) Inventors: Siong Thye Goh, Cambridge, MA (US); Chao Yuan, Plainsboro, NJ (US); Amit Chakraborty, East Windsor, NJ (US); Matthew Evans, Winter Park, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 391 days.

(21) Appl. No.: 15/510,270

(22) PCT Filed: Sep. 3, 2015

(86) PCT No.: PCT/US2015/048265
§ 371 (c)(1),
(2) Date: Mar. 10, 2017

(87) PCT Pub. No.: WO2016/040082
PCT Pub. Date: Mar. 17, 2016

(65) Prior Publication Data
US 2018/0231394 A1 Aug. 16, 2018

Related U.S. Application Data

(60) Provisional application No. 62/048,588, filed on Sep. 10, 2014.

(51) Int. Cl.
*G01D 3/08* (2006.01)
*G05B 23/02* (2006.01)
(Continued)

(52) U.S. Cl.
CPC .............. *G01D 3/08* (2013.01); *G01M 15/14* (2013.01); *G05B 23/024* (2013.01); *G06F 17/18* (2013.01)

(58) Field of Classification Search
CPC ...................................................... G01D 3/08
See application file for complete search history.

(56) References Cited

U.S. PATENT DOCUMENTS 5,465,321 A 11/1995 Smyth
6,609,036 B1 8/2003 Bickford
(Continued)

FOREIGN PATENT DOCUMENTS

CN 101153809 A 4/2008
CN 101937207 A 1/2011
(Continued)

OTHER PUBLICATIONS

Haining Liu et al:"Sparse Coding Based Machine Condition Recognition and its Application in the Condition Monitoring of a Heavy Roller Grinder"; School of Mechanical Engineering Shanghai Jiao Tong University / Jul. 8, 2011.
(Continued)

Primary Examiner — Manuel A Rivera Vargas

(57) ABSTRACT

A method and system for recognizing (and/or predicting) failures of sensors used in monitoring gas turbines applies a sparse coding process to collected sensor readings and defines the L-1 norm residuals from the sparse coding process as indicative of a potential sensor problem. Further evaluation of the group of residual sensor readings is perform to categorize the group and determine if there are significant outliers ("abnormal data"), which would be considered as more likely associated with a faulty sensor than noisy data. A time component is introduced into the evaluation that compares a current abnormal result with a set of prior results and making the faulty sensor determination if a
(Continued)

significant number of prior readings also have an abnormal value. By taking the time component into consideration, the number of false positives is reduced.

20 Claims, 5 Drawing Sheets

(51) Int. Cl.
  *G01M 15/14* (2006.01)
  *G06F 17/18* (2006.01)

(56) References Cited

U.S. PATENT DOCUMENTS

| | | | |
|---|---|---|---|
| 6,741,919 | B1 | 5/2004 | Schuster et al. |
| 9,104,199 | B2 * | 8/2015 | Whatley ................ F02D 41/22 |
| 9,568,378 | B2 * | 2/2017 | DeSilva ................ G01K 11/22 |
| 2005/0125117 | A1 | 6/2005 | Breed |
| 2005/0149297 | A1 | 7/2005 | Guralnik et al. |
| 2007/0124113 | A1 * | 5/2007 | Foslien ................ G05B 23/024 |
| | | | 702/185 |

FOREIGN PATENT DOCUMENTS

| | | |
|---|---|---|
| CN | 102608446 A | 7/2012 |
| CN | 103020935 A | 4/2013 |
| CN | 103295242 A | 9/2013 |
| CN | 103592014 A | 2/2014 |
| EP | 1729243 A1 | 12/2006 |
| JP | S59149513 A | 8/1984 |
| JP | 2001350496 A | 12/2001 |
| WO | 2006088545 A2 | 8/2006 |

OTHER PUBLICATIONS

Miao Zhong-Hua et al:; "Tests and Feature Extraction Algorithm of Vibration Signals Based on Sparse Coding"; Journal of Vibration and Shock, vol. 33, No. 15 issue; /Aug. 15, 2014.
Li Yebo et al;: "Fault Diagnosis for Sensors and Components of Aero-Engine"; College of Energy and Power Engineering, Nanjing University of Aeronautics and Astronautics, Nanjing 210016; V.20130927.0919.002.html; liyebo1985@163.com / Sep. 30, 2013.
International Search Report dated Dec. 11, 2015; PCT/US2015/048265; International Filing Date: Sep. 3, 2015; 11 pages.

* cited by examiner

GAS TURBINE SENSOR FAILURE DETECTION UTILIZING A SPARSE CODING METHODOLOGY

CROSS-REFERENCE TO RELATED APPLICATIONS

This application claims the benefit of U.S. Provisional Application Ser. No. 62/048,588, filed Sep. 10, 2014 and herein incorporated by reference.

TECHNICAL FIELD

The present invention relates to the supervision of gas turbines utilized in power generation networks and a methodology for improving the ability to detect failure of any of the sensors used to monitor the performance of the turbine, including the ability to predict failure of a particular sensor.

BACKGROUND

Efficient use of fossil fuels is crucial in maintaining a stable power network. A particularly efficient means of transforming this type of fuel into electrical energy is the gas turbine. Gas turbine components operate in a very high temperature environment and under a variety of loading conditions. Deterioration of parts due to thermal fatigue and wear is a real concern. Maintenance is performed to detect and control wear, as well as to repair or replace worn parts as needed to continue to ensure efficient operation.

The performance of a gas turbine is typically monitored by using a variety of different sensors to assess various aspects of its operation (i.e., power sensors, temperature sensors, pressure sensors, etc.). Unfortunately, the sensor readings themselves tend to be relatively noisy, so at times it is difficult to know if a sensor is properly operating.

There have been a variety of approaches in the prior art that have been used to study the problem of detecting faulty sensors. One approach, for example, monitors for three specific types of errors in sensor readings: short faults, constant faults, and noise faults. Traditional statistical methodologies utilizing principal component analysis (PCA) to search for "faulty sensor" signatures in the sensor readings have been undertaken.

These and other approaches to performing fault detection in gas turbine sensors use a threshold-based approach. That is, if a particular sensor reading is above a given threshold, the sensor is declared as "faulty". While workable, this approach does not take the time component of the sensor's working environment into consideration. Additionally, since there may be a large noise component in some sensor readings, the threshold approach may have a difficult time discerning the difference between noisy data and a faulty sensor. As a result, this threshold-based approach may yield a large number of false positives, which can be translated into unnecessary inspections of the sensors, interrupting the performance of the gas turbine.

SUMMARY OF THE INVENTION

The needs remaining in the prior art are addressed by the present invention, which relates to the supervision of gas turbines utilized in power generation networks and a methodology for improving the ability to accurately detect a sensor failure, including the ability to predict failure of a particular sensor.

In accordance with the present invention, a sparse coding process is used to analyze the sensor readings. The sparse coding approach is considered to be well-suited to this task, since the intent is to identify a minimal number of "faulty sensor" readings from among a vast collection of normal sensor readings. The residuals from the sparse coding process are defined as potentially abnormal sensor readings and are further processed to introduce a time factor into the analysis and make a decision to define the residual as either "noisy data" or "faulty sensor".

The sparse coding portion of the inventive process consists of two main components: (1) dictionary learning and (2) anomaly detection by computing representations of the collected data within the coordinate space defined by the dictionary learning and defining as anomalies that data which does not fit within the vector space of the dictionary. In accordance with the present invention, the anomalies (residuals) take the form of sensor readings that exceed a normal operating range. In a preferred embodiment of the present invention, the L-1 norm is used to define the residual (instead of the conventional L-2 norm), since the L-1 norm (also known as the "least absolute deviation" or "least absolute error" value) is less likely to yield false positive results—which is a problem when studying the typically noisy gas turbine sensor readings.

Post-processing functions are used to evaluate the residuals identified by the sparse coding and determine which, if any, are indicative of a faulty sensor. One exemplary post-processing approach employs a one-class Support Vector Machine (SVM) to create a model of the set of residuals. Another post-processing approach develops a threshold value based on the particular values of the group of residuals. In either case, a set of time-based readings are compared against the model being used and a "faulty sensor" detection is declared if a sufficient amount of the data collected over time meets the criteria. A "sensor failure" message is then sent to the personnel responsible for gas turbine maintenance, identifying the specific sensor to be repaired or replaced.

In one embodiment, the present invention takes the form of a method for detecting gas turbine sensor failure based upon collected readings from at least one sensor, comprising: (1) creating a dictionary of basis vectors defining values associated with known sensor readings for normal operating conditions; (2) applying a sparse coding process to a set of sensor reading data, using the created dictionary, to identify a set of L-1 norm residual data; (3) evaluating the L-1 norm residual data so as to categorize a predetermined subset of the largest-valued L-1 norm residual data as abnormal sensor readings; (4) comparing the abnormal sensor readings to a plurality of prior sensor readings and defining the designated abnormal sensor readings as associated with a sensor failure if a predefined number of the prior sensor readings are also designated as abnormal sensor readings; (5) transmitting a sensor failure signal to gas turbine personnel, identifying the particular sensor and (6) removing the failed sensor from service, and repairing or replacing the failed sensor.

In another embodiment, the present invention is described as a system for detecting failure of a gas turbine sensor comprising these components: (1) a database of sensor readings; (2) a sensor monitoring system component in communication with the database of sensor readings, the sensor monitoring system component include a program storage device and a processor, the program storage device embodying in a fixed tangible medium a set of program instructions executable by the processor to perform the method steps of: (a) creating a dictionary of basis vectors defining values associated with known sensor readings for normal operating conditions, (b) applying a sparse coding process to a set of sensor reading data, using the created dictionary, to identify a set of L-1 norm residual data, (c) evaluating the L-1 norm residual data so as to categorize a predetermined subset of the largest-valued L-1 norm residual data as abnormal sensor readings, (d) comparing the abnormal sensor readings to a plurality of prior sensor readings and defining the designated abnormal sensor readings as associated with a sensor failure if a predefined number of the prior sensor readings are also designated as abnormal sensor readings and (e) transmitting a sensor failure signal to gas turbine personnel, including information identifying the failed sensor, so as to be repaired or replaced; and (3) a monitoring system database for storing sensor readings classified as abnormal.

In yet another embodiment of the present invention, the sensor readings evaluated by the sparse coding process may be used to predict impending sensor failure (as opposed to a condition where the failure has already occurred).

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
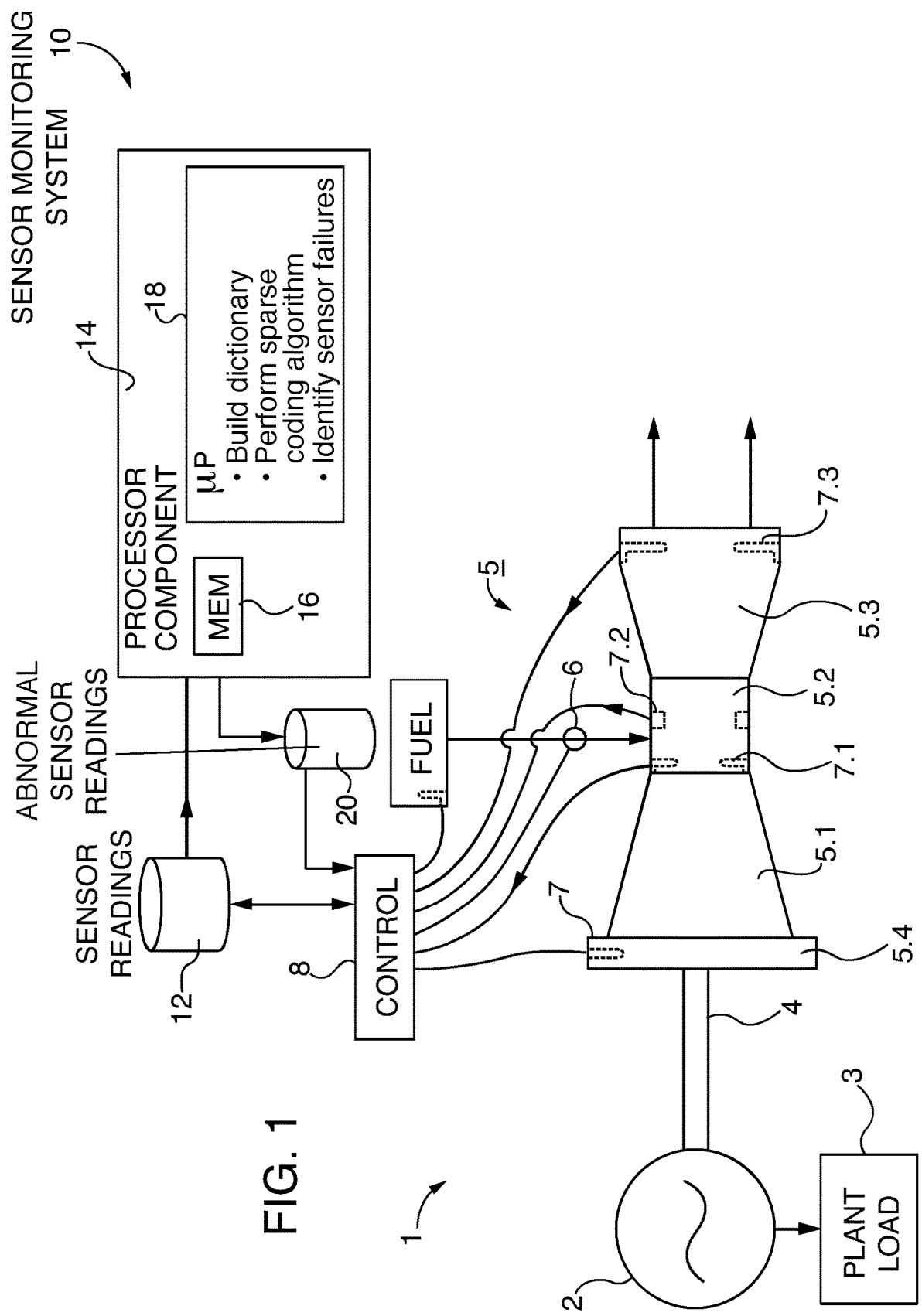
FIG. 1 is a simplified depiction of an exemplary gas turbine environment within which the inventive system and method of detecting fault sensors may be used.

FIG. 1 is a simplified depiction of a typical gas turbine power plant 1 with a generator 2 supplying a plant electric load 3. Generator 2 is driven by a shaft 4 powered by a gas turbine engine 5. Gas turbine engine 5 is itself comprised of a large number of separate components, including a compressor 5.1, a combustion section 5.2, a turbine 5.3, and, perhaps, a set of adjustable inlet vanes 5.4.

Fuel is supplied to combustion section 5.2 via a valve 6. In order to maintain acceptable operation of gas turbine power plant 1, a number of sensors 7 are used to monitor the operation of the various components, passing the measured sensor readings to a separate control module 8. Control module 8 may be co-located with gas turbine power plant 1, or may be off-site from the turbine itself. In the diagram of FIG. 1, sensors 7 include a combustor inlet air sensor 7.1, a combustion temperature sensor 7.2, and a blade path temperature sensor 7.3. It is to be understood that there are many more sensors used to monitor the performance of a gas turbine, measuring conditions such as temperature, pressure, rotation, vibration, etc. Indeed, it is possible that close to 200 different sensors may be utilized with a given gas turbine power plant.

Control module 8 receives inputs from sensors 7, and transmits control signals to valves, motors, and actuators as known in the art. The controller may include one or more processors, in one or more locations with associated hardware and software as known in the art.

Inasmuch as the performance of a gas turbine is dependent upon accurate sensor readings, it is important to be able to recognize when a sensor has begun to fail and is delivering inaccurate readings. As mentioned above, a significant aspect of understanding sensor behavior includes the ability to discern between a one-time faulty reading (which may be due to various environmental factors and, therefore, can be ignored) and a series of on-going faulty readings (which may be more subtle in presentation), since the latter condition is more likely to result from a sensor that has failed and needs to be replaced. Moreover, as mentioned above, the typical analog sensor readings collected by gas turbine sensors tend to include a relatively large noise component, limiting the ability to differentiate between "noisy data" and "faulty sensor".

In contrast to various prior art techniques that use a basic threshold sensor reading as an "alarm", the methodology of the present invention performs an analysis on a time series data set of sensor readings. A sparse coding technique is used to derive the dictionary that properly characterizes the universe of acceptable sensor readings, where any readings that fall outside of the defined boundaries of the basis vectors (referred to as a "residual") are classified as a potential problem. A model of the residuals is created and used to determine if there is a sufficient body of abnormal readings as a function of time to define the circumstance as a "faulty sensor".

Therefore, in accordance with the present invention, the capabilities of control module 8 are extended to include a sensor monitoring system 10 that may be utilized, as discussed in detail below, to analyze the collected sensor readings and look for any tell-tale changes in sensor readings that are indicator of a failure of a particular sensor, or may reasonably predict that a sensor failure is likely to occur within the next few days. As will be discussed in detail below, sensor monitoring system 10 includes a database 12 of all historical sensor readings (which may go back a number of years); indeed, this database may form part of a conventional control module 8. Sensor monitoring system 10 includes a processor component 14 with a memory 16 and processor 18, these elements being used to perform the actual evaluation of the sensor readings data and monitor the performance of the sensors themselves. The output from sensor monitoring system 10, which takes the form of an alert of an "abnormal" sensor reading, is then used by plant personnel in deciding whether or not the sensor needs to be replaced or repaired. The specific architecture of sensor monitoring system 10 as shown in FIG. 1 is considered to be exemplary only, various other configurations of hardware and software components may be configured to perform the method of the present invention as described in detail below.

Figure 2:
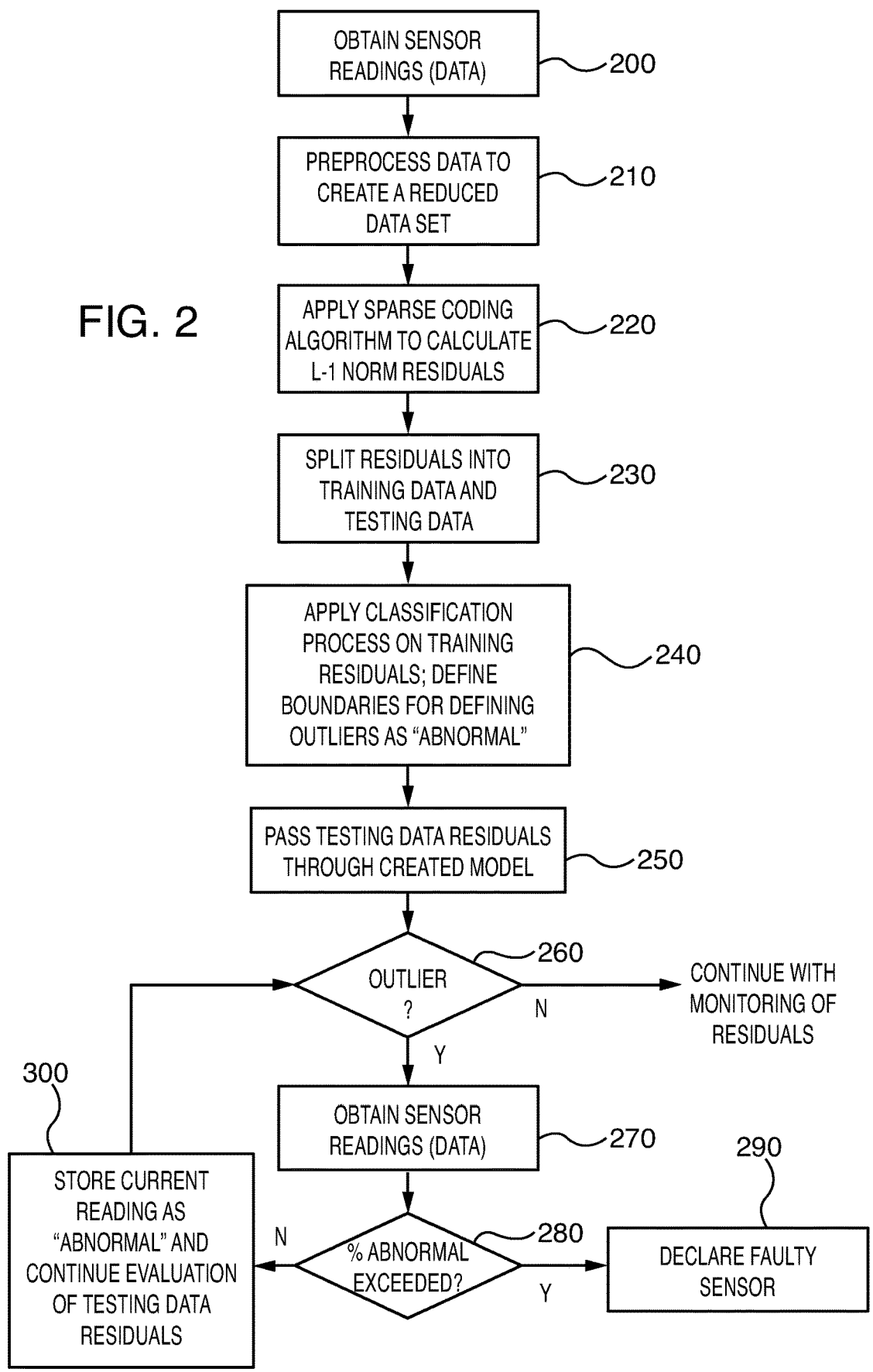
FIG. 2 is a flowchart of an exemplary process of the present invention that may be utilized to evaluate collected sensor readings and determine if one or more sensors has become faulty and needs to be repaired or replaced.

FIG. 2 is a flowchart of an exemplary process of the present invention that may be utilized by sensor monitoring system 10 to evaluate the collected sensor readings and determine if one or more sensors has become faulty and needs to be repaired or replaced.

The process begins, as shown in step 200, by collecting the actual sensor reading data and storing the data in an element where it can be later retrieved and analyzed. For example, it is presumed that controller 8 of FIG. 1 includes memory elements and processing capabilities to perform these functions. Once the data is collected, a preliminary step may involve "preprocessing" the sensor readings (step 210) so as to remove obvious outliers and redundant data that would otherwise skew the results of the analysis. While this preprocessing step is not considered mandatory (and is shown as a dotted line box in the flowchart), in a preferred embodiment of the present invention it is utilized in order to arrive at an accurate solution in an efficient manner.

Step 220 is associated with the actual process of performing the "sparse coding" on the collected data set. As will be discussed in more detail below, sparse coding includes defining a set of basis vectors that can be used to accurately represent the data set (in this case, accurately represent the sensor readings). The few data points that do not fit within the sparse coding vector space, referred to as "residuals", are those data that may be noisy or otherwise associated with faulty sensors. While various different vector norms may be used to determine the level at which the data falls outside of the vector space, the noisy data attributed to sensor readings is best-suited for using the L-1 norm (i.e., the least absolute deviation norm).

The residuals as identified in step 220 are then further evaluated to ultimately determine if the data points are merely noisy data, or are truly associated with a faulty sensor. The next step (shown as step 230 in the flow chart of FIG. 2), divides the residuals into two groups: a first group used as a training set and a second group used as a test set. The training residuals are then used, as will be discussed below, to develop an appropriate model for evaluating the group of residuals and determining the limit for defining the few largest residuals as being associated with "abnormal" operation of the sensor (step 240).

Once the parameters of the model have been identified, the residuals created by performing the sparse code processing on the test data are then passed through this model (step 250), where a comparison is performed and a decision is made whether or not a current "residual" being tested falls within the model, or is outside the model (step 260). Those residuals that fall outside of the model are then identified as "abnormal", labeled as such and stored in memory for further use.

It is at this point in the process that the time component of the analysis is introduced. With the discovery of an "abnormal" data point, the next step in the process (step 270) is to review the data points over a number of previous points in time, and see if a significant number of these data points have also been identified as "abnormal". Again, different measures may be used at this point in evaluating the number of "abnormal" readings are required to be found over a given period of time.

If a significant percentage of sensor reading data as a function of time continue to be flagged as "abnormal" (step 280), then a decision is made that the associated sensor may be faulty and there is need to evaluate the actual device (step 290). Otherwise, the current "abnormal" reading is retained in the memory element, and the process of monitoring the sensor readings continues (step 300). It is to be understood that the process as outlined in the flowchart of FIG. 2 is also useful in predicting sensor failures prior to their occurrence, since the sensor reading data may begin to degrade and generate a larger number of residuals as the sensor begins to fail.

The following discussion includes a brief overview of a sparse coding technique, particularly as it applies to the gas turbine/sensor environment of the present invention, followed by a discussion of two different post-processing techniques that can be used to develop a model to analyze the residuals and introduce the time factor into the analysis. An example of the application of the inventive methodology to actual gas turbine sensor readings then follows.

A "sparse coding" process in general relates to a class of algorithms for finding a succinct representation of an input signal (in this case, the input signal taking the form of gas turbine sensor readings). In particular, sparse coding as a signal analysis technique is part of a methodology for learning sets of over-complete bases (also sometimes referred to as a set of basis vectors) that represent data in an efficient manner. The "sparsity" refers to the limited number of non-zero components present when most of the transform coefficients (except for a few large coefficients) are approximated to zero. In accordance with the present invention, the data being studied is the time series sensor readings (a different set of data collected for each sensor). As opposed to conventional techniques for studying gas turbine sensor data (such as the PCA approach mentioned above), sparse coding provides the ability for the basis vectors to better capture structures and patterns (as well as anomalies) in the input data (since it is an over-complete set of basis vectors). Sparse coding allows a given input data set X to be represented as a linear combination of one or more basis vectors in the dictionary $D=[d_1, d_2, \ldots, d_t] \in R^{m \times k}$.

In accordance with the present invention, the faulty sensor readings are defined as "anomalies" and are able to be computed by utilizing a sparse coding process with anomaly detection. Sparse coding consists of two main components, a dictionary learning component and a coordinate component for representing the input data by the basis vectors forming the "dictionary space". For the dictionary learning part, the following optimization problem is solved:

$$\min_{D,X} \|Y-DX\|_F^2 + \alpha \|X\|_1, \text{s.t.} \|D\| << 1. \tag{1}$$

The constraint of $\|D\|<<1$ is imposed to ensure that the dictionary D does not grow arbitrarily big in order to arrive at a small norm of X. The first term in the dictionary learning problem is the "reconstruction" term (i.e., representing the data by a set of basis vectors) and the second term is included to encourage sparseness in the representation (as a function of the selected value of a).

The optimization problem is biconvex in D and X; that is, when one variable is fixed, the remaining optimization problem is a convex optimization problem. It follows, therefore, that an acceptable result is provided by solving for each variable in an alternating manner such that convergence to the optimal solution is guaranteed and approaches such as Alternating Direction Method of Multipliers (ADDM) are considered as preferred (or other approaches that are also relatively robust and able to provide arbitrary-scale optimization of data). Ultimately, a dictionary D of basis vectors that may be used to define the sensor reading data as a linear combination of the basis vectors is obtained. Any suitable dictionary learning algorithm may be utilized, including an online-learning dictionary where the vectors are built in real time based on the actual data. Additionally, rather than using arbitrary values to initialize the dictionary, a preferred approach is to use a k-means algorithm to find the appropriate centers of data clusters, using the centers to initialize the process. This technique is considered to improve the speed of convergence for the learning process.

This dictionary can be thought of as the universe of acceptable sensor readings, where any incoming reading of a "normal value" can be accurately expressed as a linear combination of the basis vectors. In accordance with the present invention, this dictionary is used in conjunction with the sparse coding process to monitor the performance of an associated sensor and detect the presence of sensor readings that fall outside of the dictionary space (these readings referred to as "residuals", and denoted as E in the following discussion). That is, for the given dictionary D, the process of the present invention proceeds by evaluating the incoming sensor readings with respect to dictionary D, using the following relation:

$$\min_{E,X} \|Y-DX-E\|_F^2 + \alpha\|X\|_{1,2} + \beta\|E\|_{1,1}, \quad (2)$$

where $\|X\|_{1,2}$ is the sum of the L-2 norm of each row of matrix X, and $\|E\|_{1,1}$ is the sum of the L-1 norm residuals of each column of matrix X, with $\alpha$ and $\beta$ being small positive scalars. This approach is also known as the "multiple measurement vector" (MMV) approach. The term $\beta\|E\|_{1,1}$ is the "residual" and is used to determine if the incoming sensor data is straying beyond accepted values such that the sensor needs to be evaluated as perhaps "faulty". The $\beta$ factor can be used by the monitoring personnel to adjust the level of sensitivity that identifies selected sensor readings as residual.

As shown, the L-1 norm is used to define this "residual", rather than the conventional L-2 norm used for anomaly detection. This is because the L-2 norm produces a significant number of large residuals (and, as a result, a significant number of false positives in terms of faulty sensors). The L-1 norm, which is a sum of the datapoint values as defined below, is considered to be a preferable measure when evaluating data that may include a large noise factor and the goal is to be able to discern the difference between noise error and abnormal sensor readings. The use of the L-1 norm, as discussed, encourages sparseness in the residual, as well as providing a better fit to the data. In contrast, if the L-2 norm were to be used when dealing with noisy data (such is the case here with the gas turbine sensor data), the resulting residuals would tend to be very numerous and relatively large (instead of the preferred smaller residual values).

Figure 3:
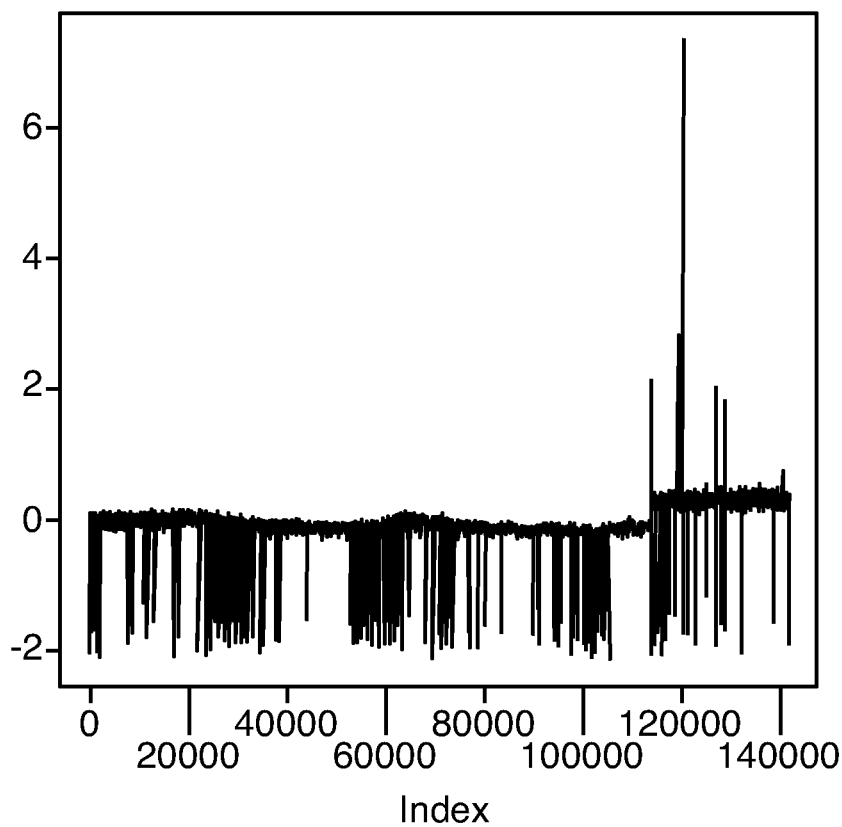
FIG. 3 is a diagram of the residuals computed by applying the L-2 norm to the sparse coding process, illustrating the problems associated with using the L-2 norm to detect sensor failures.
Figure 4:
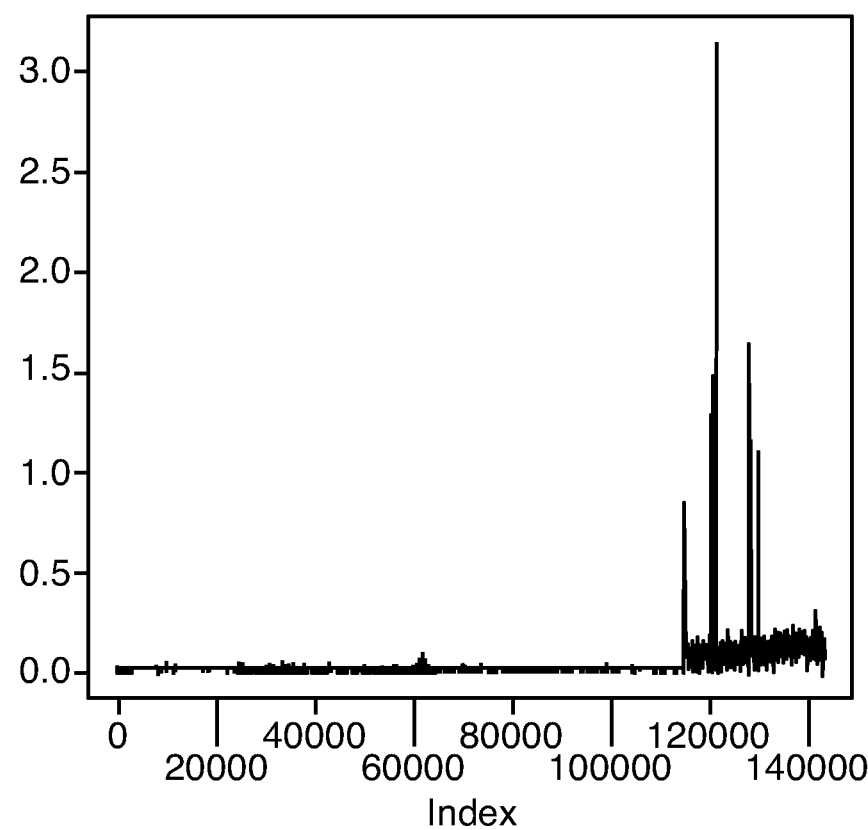
FIG. 4 is a diagram of the residuals computed in accordance with the teachings of the present invention by applying the L-1 norm to the sparse coding process.

FIGS. 3 and 4 illustrate the difference in results between using the L-2 norm (as shown in FIG. 3) and the L-1 norm (as shown in FIG. 4) in creating the residuals. It is clear that the L-2 norm results in identifying quite a large number of data points as "residuals", which could lead to an undesirable number of false positive "faulty sensor" alarms. The residuals generated by using the L-1 norm, on the other hand, are fewer and much more distinct. The "experiment" description details related to these graphs will be described in detail below.

Returning to the discussion of the inventive methodology, the problem as presented in equation (2) is solved by applying the ADMM optimization technique. The solution, which takes the form of a set of residuals $E^k$, is in this case a set of sensor readings that are out of bounds from the norm and may be associated with faulty operation of the sensor. As shown in the following listing, the MMV algorithm (as discussed above when discussing biconvex variables D and X) is changed such that the conventional shrinkage operator (as used in step 2, below) is replaced by an element-wise "soft thresholding" operator when the residual E is updated in an iterative manner (step 3, below). The soft thresholding is modified procedure that still splits the data as cleanly as possible, but introduces a "slack" variable that modifies the maximum margin and allows for some mislabeled data to be created. The following listing shows in detail an algorithm used to compute the L-1 residuals of sparse coding, where the table included immediately below defines the parameters included in the algorithm:

| Parameter | Definition |
| --- | --- |
| Z | Auxiliary variable |
| E | Residual |
| M | Lagrange multiplier |
| μ | Penalty coefficient (controls penalty associated with equality constraint in ADMM formulation) |
| ρ (ρ > 1) | Parameter in ADMM algorithm to update μ |
| ∈ | Error tolerance used to measure the closeness of Z to X to terminate the algorithm |

ALGORITHM FOR COMPUTING L-1 RESIDUALS OF SPARSE CODING (RESIDUALS TO BE ANALYZED AS POSSIBLY INDICATIVE OF POTENTIAL SENSOR FAILURE)

Solve: $\min_{E,X} \|Y - DX - E\|_F^2 + \alpha\|X\|_{1,2} + \beta\|E\|_{1,1}$,
Input: Signals $X \in \Re^{N \times L}$, Dictionary $D \in \Re^{N \times M}$
Initialize: set k = 0; $Z^0$, $E^0$, $M^0$, $\mu^0 > 1, \epsilon$
Repeat until convergence:
1. $X^{k+1} = \mathrm{argmin}_X L(X, Z^k, E^k, M^k, \mu^k) = (D^T D + \mu^k I)^{-1}(D^T(Y - E^k) + M^k + \mu^k Z^k)$,
where L is the Augmented-Lagrangian and is defined as follows:

$$L(X, Z, E, M, \mu) = \frac{1}{2}\|Y - DX - E\|_F^2 + \alpha\|Z\|_{1,2} + \beta\|Z\|_{1,1} + \langle M, Z - X \rangle +$$

$$\frac{\mu}{2}\|Z - X\|_F^2$$

2. $Z^{k+1} = \mathrm{argmin}_Z L(X^{k+1}, Z, E^k, M^k, \mu^k) = \mathrm{argmin}_Z \frac{1}{2}\|P - Z\|_F^2 + \gamma\|Z\|_{1,2}$, where $P = X^{k+1} - \frac{1}{\mu^k}$. This optimization problem can be solved by using the row -continued ALGORITHM FOR COMPUTING L-1 RESIDUALS OF SPARSE CODING
(RESIDUALS TO BE ANALYZED AS POSSIBLY INDICATIVE OF POTENTIAL
SENSOR FAILURE)

shrinkage operator:

$$Z^{k+1}(j,:) = \begin{cases} \frac{\|P(j,:)\|_2 - \gamma}{\|P(j,:)\|_2} P(j,:) & \text{if } \gamma < \|P(j,:)\|_2 \\ 0 & \text{otherwise} \end{cases}$$

3.
$$E^{k+1} = \operatorname{argmin}_E L(X^{K+1}, Z^{k+1}, E^k, M^k, \mu^k) = \operatorname{argmin}_Z \frac{1}{2}\|Q - E\|_F^2 + \beta\|E\|_{1,1}, \text{ where}$$

$Q = Y - DX^{k+1}$. This optimization problem can be solved by using the element-wise soft thresholding operator $E^{k+1} = S_\beta(Q)$, where $$S_\beta(\alpha) = \begin{cases} \alpha - \beta & \text{if } \alpha > \beta \\ 0 & \text{if } |\alpha| \leq \beta \\ \alpha + \beta & \text{if } \alpha < -\beta \end{cases}$$

4. $M^{k+1} = M^k + \mu^k(Z^{k+1} - X^{k+1})$
5. $\mu^{k+1} = \rho\mu^k$
6. $k = k + 1$ 7.
Stop if: $\frac{\|Z^k - X^k\|_F^2}{\|X^k\|_F^2} < \epsilon$.

Output: $E^k$

The values of $E^k$ produced by this algorithm, defined as "residuals", are potential data points associated with faulty operation of a gas turbine sensor. Referring back to the flowchart of FIG. 2, the generated residuals are the output from step 220. In order to evaluate these residuals and take the time component into consideration, there are at least two different approaches that may be utilized in accordance with the present invention.

In the first approach, a training residual is used to learn a one-class support vector machine (SVM) model using a radial basis function (RBF) kernel. Generally speaking, an SVM model is used in association with learning algorithms to analyze the data (in this case, the residuals) and recognize patterns. An SVM builds a model of separate categories and thereafter assigns newly-arriving data into the proper category. A "one-class" SVM, as used here, creates only a single category and functions to evaluate newly-arriving data and makes the determination of whether or not the data falls in the category. To increase the efficiency of the SVM algorithm, it is possible to use a sampling of the training residuals instead of the complete set. The SVM "one class" model is then applied to newly-arriving residuals. In this model, most of the residual data will fall into the boundaries of the created model, leaving only a relatively few values as "outliers". These outliers are then defined as the "abnormal" sensor readings that may prompt further evaluation of the sensor itself. Indeed, the abnormal readings may be indicate that a sensor failure has already occurred or, alternatively, be used as a prediction that a sensor is beginning to fail and needs attention.

To reduce the number of false positives, it is proposed that the sensor reading data for the previous T time steps is reviewed. If a high percentage (denoted p %) of the reviewed data is also defined as abnormal (according to the generated one-class SVM model), then the current data point is defined as alerting a probable "faulty sensor".

Figure 5:
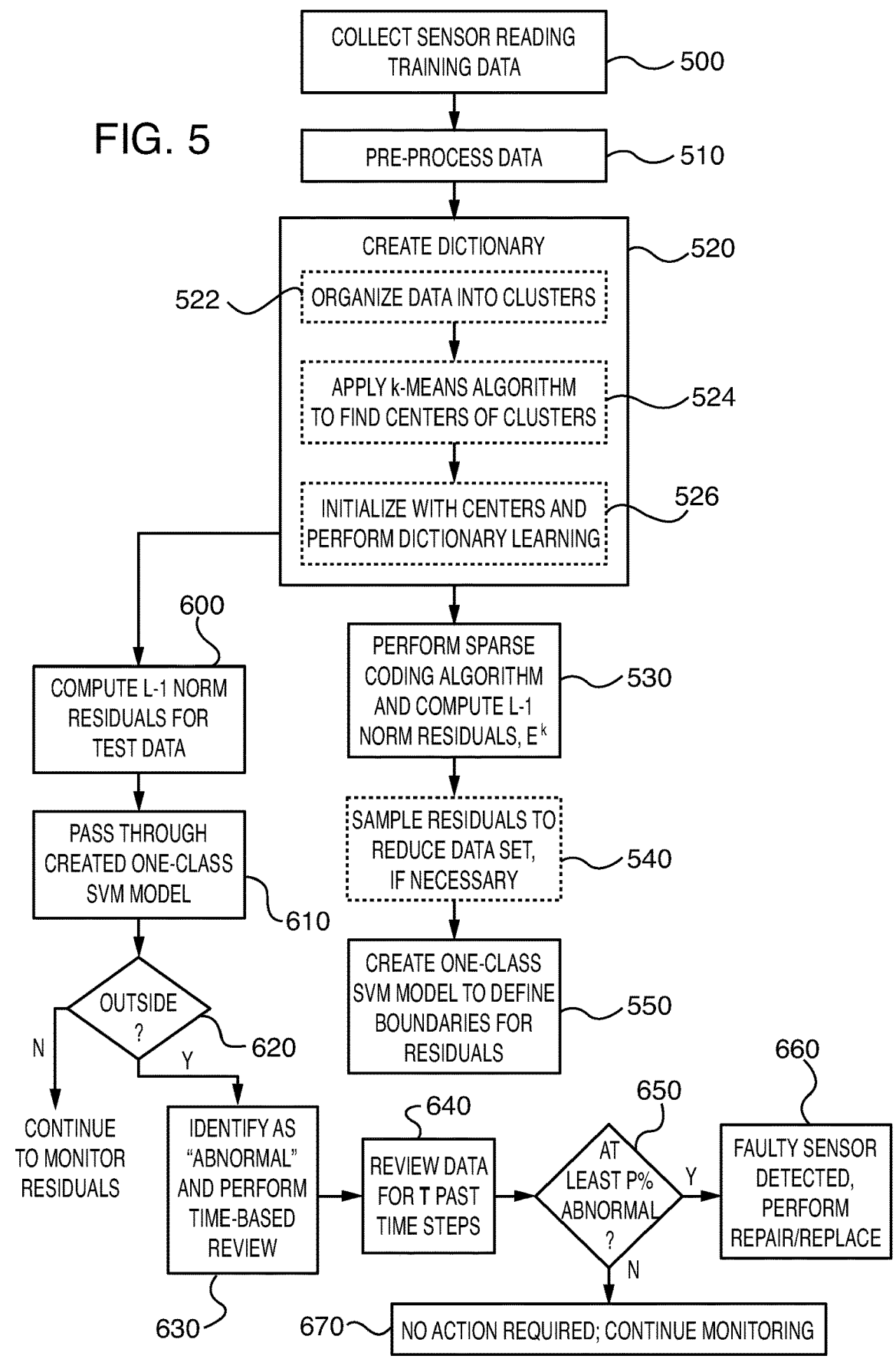
FIG. 5 is a flowchart of a method for evaluating the L-1 norm residuals using a one-class Support Vector Machine (SVM) model approach to determine which residuals are properly "abnormal" and indicate failure of a sensor.

The flowchart of FIG. 5 outlines this exemplary process of sensor fault detection. The flowchart presumes that the data for a particular sensor is being reviewed, and that the data is cleaned to remove outliers and readings that are less than 20% of maximum sensor reading value.

The process begins at step 500 by collecting the raw data from the various gas turbine sensors (this data being stored within the memory component of controller 8, as discussed above). For the sake of discussion, it is presumed that the sensor associated with generated output power (MW) of the turbine is being evaluated. The data is preferably pre-processed, as shown in step 510, to eliminate the sensors that are not associated with this parameter, as well as any sensors whose data is not strongly correlated to the power sensor output.

Once preprocessed, the remaining data is subjected to the sparse coding process as outlined above. As shown in FIG. 5, this process begins by first building a dictionary of basis vectors for this data (step 520) and then applying the sparse coding algorithm with anomaly detection as shown in equation (2) to the sensor reading data, computing the L-1 norm residuals from this data (step 530). While various methods of building a dictionary may be used in step 520, a preferred process that converges in an efficient manner includes the steps of clustering the data (step 522), using a k-means algorithm to find the centers of the clusters (step 524), and initialize the dictionary with these "center" values (526). Once built, the dictionary is the used in the sparse coding process of step 530 to identify the L-1 norm residuals. Once identified, the L-1 norm residuals are then further evaluated, including a time-based review of the data, to determine which of these residuals are truly "abnormal" sensor readings that are indicative of a faulty sensor.

Referring to FIG. 5, the set of L-1 norm residuals may first be sampled (step 540) to reduce the number of datapoints involved in the remainder of the analysis. This step is optional, but is considered to improve the efficiency of the SVM algorithm used in the following step 550. Indeed, the SVM algorithm then uses the sampled group of residuals as "training data" and builds a suitable one-class model which is thereafter used to classify newly-arriving residuals as either being within the class, or residing outside of the class (the outlier data defined as "abnormal" for present purposes).

In order to verify the accuracy of the developed one-class model (and as outlined in the general flowchart of FIG. 2), a set of test data is passed through the one-class SVM model. Referring to FIG. 5, the test data is processed (step 600) to compute its set of L-1 residuals (using the dictionary built in step 520). The test data set of L-1 residuals is then passed through the SVM model created in step 550 (shown as step 610). Any data points that are identified as "abnormal" (i.e., outside the boundaries of the SVM model during an evaluation at step 620) are collected and stored (step 630).

In accordance with the present invention, the time factor associated with the analysis is now introduced, where in step 640 a review of the data for a set of previous T time steps is performed ("T" being a value that is determined by the individual performing the analysis). A decision is then made at step 650, where if more than p % of the previous T time steps also included "abnormal" data points (again, p being a value selected by the user), then the associated sensor is defined as being, perhaps, "faulty" and an evaluation of the actual sensor is appropriate (step 660). Otherwise, if less than p % of the previous T time steps do not have these abnormal readings, it can be concluded that the current abnormal reading may be attributed to a noisy reading, spurious error, or the like; in any event, if the p % threshold is not exceeded, it can be presumed that the sensor is operating properly and no further evaluation is required (step 670).

Figure 6:
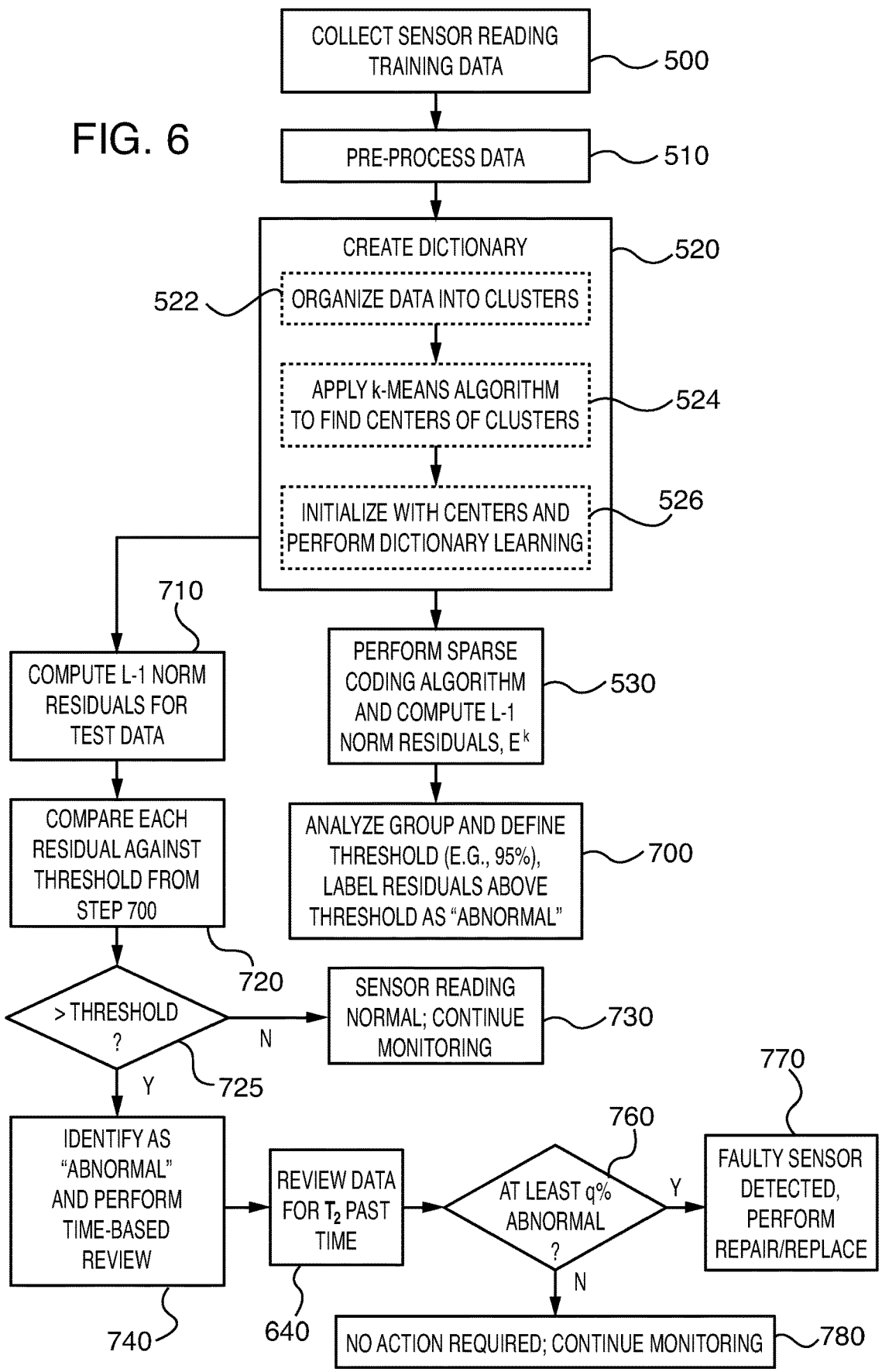
FIG. 6 is a flowchart of an alternative method for evaluating the L-1 norm residuals and detecting the presence of sensor failure.

Instead of using the one-class SVM model, it is possible to combine the sparse coding methodology (utilizing the L-1 norm for designating residuals) with other kinds of analyses to further study the residual data and ascertain if any of the data can be associated with faulty performance of the related sensor. FIG. 6 is a flowchart of one such alternative analysis process, where in this case a threshold analysis is used instead of the one-class SVM model to determine if incoming sensor readings are indicative of a faulty sensor. As shown in the flow chart of FIG. 6, the initial steps in the process are the same as those shown in FIG. 5; namely, preprocessing the training data (step 510), building a dictionary of basis vectors (step 520) and utilizing sparse code processing (step 530) to compute a set of L-1 residuals.

Once the residuals associated with the training data are computed, the process as shown in FIG. 6 continues at step 700 by analyzing the set of residuals identified in the training data and determining a proper threshold value for the group such that any value in excess of the threshold would be designated as an "abnormal" data point. This threshold can be uniform for all sensors, or may be defined on a sensor-by-sensor basis. For example, a threshold value of 95% may be used, such that the 5% largest residual values are defined as "abnormal", and the remainder of the residuals is ignored.

At this point in the process, the L-1 residuals for the testing data is next determined (step 710), using the same dictionary as built in step 520 and performing the same sparse coding process exemplified by step 530. Once the L-1 residuals for the testing data are computed, they are compared (in step 720) against the threshold defined in step 700. If a given test data residual is less than the threshold (at decision 725), the data is designated as "noisy" data in step 730 (or some similar type of designation which indicates that no further study is required).

Presuming that the result of the threshold test in step 725 is positive, the above-threshold residual is designated as "abnormal" and stored (as shown in step 740). The time aspect of the analysis is introduced at this point, and the data for the previous $T_2$ time steps is reviewed (step 750). A decision is then made in the following step 760, where if q % of the $T_2$ previous results were all above threshold, a determination is made that the current data point is indicative of a sensor fault, and further investigation of the sensor itself is warranted (step 770). Otherwise, if the threshold is not exceeded at decision step 760, the current data point is labeled as "noisy" (or a similar designation), and the review process continues.

It is to be noted that in a preferred embodiment of the process as outlined in FIG. 6 a value of q=100 is used, requiring that all of the past $T_2$ values be designated as "abnormal" prior to requesting that a particular sensor be evaluated as possibly defective.

Detailed Example of Sparse Coding utilized in Detecting a Faulty Gas Turbine Sensor In an experimental approach to determine the accuracy of the inventive sparse coding approach to detecting a sensor fault, a set of historical data for a given gas turbine was studied. The sensor data MW is the sensor that indicates whether the machine is still running and the readings are continuous, real values. The data was pre-processed as follows: (1) obvious outliers and other data points of values less than 20% below the maximum value of the MW output were removed; (2) feature selection was performed to remove redundant sensors (and their data) that are not relevant to MW readings (using, for example, the "area under ROC" criteria); and (3) all remaining sensors that exhibited a weak linear correlation relationship with MW were removed. Ultimately, a set of 15 sensors remained for further evaluation.

The set of data associated with the remaining 15 sensors was split into two groups, the first group used as the training data and the second used as the testing data. The training data was presumed to be error-free. A random error (in this case in the form of an increasing ramp) was introduced at randomly chosen locations of the training data.

The processes as outlined in the flowcharts of FIGS. 2, 5 and 6 were used to process the data, with the values of $\alpha=0.001$ and $\beta=0.01$ used in equation (2) as the sparse coding algorithm was applied to the data and the residuals calculated. Both the one-class SVM model and threshold methods for defining "abnormal" data (i.e., a potentially faulty sensor) were evaluated. For the one-class SVM model, a sampled set of 3000 training residuals was used to form the model. For the time-based component of the SVM model, a value of p=50 was selected, and a value of T=50 was used (i.e., at least 50% of the data for the past 50 time steps was required to be "abnormal" to declare the possibility of a faulty sensor). For the threshold evaluation process, a value of q=100 was chosen and used with $T_2=24$ (i.e., 100% of the residuals for the past 24 time steps had to be above threshold in order designate the current data point as "abnormal" and indicate the possibility of a faulty sensor).

As mentioned above, a significant aspect of the present invention is the use of the L-1 norm to compute residuals, instead of the L-2 norm typically used with sparse coding processes. In general, the "norm" of a data set (displayed as vectors in a matrix) can be defined as follows:

$$\|X\|_j = (\Sigma_i |x_i|^j)^{1/j}.$$

For the L-1 norm (where j=1), this relation reduces to the following:

$$\|X\|_1 = (\Sigma_i |x_i|),$$

and is often referred to as the "least absolute deviation" (LAD) or "least absolute error" (LAE). In comparison, the L-2 can be expressed as:

$$\|X\|_2 = (\Sigma_i |x_i|^2)^{1/2} = \sqrt{x_1^2 + x_2^2 + \ldots x_n^2},$$

the conventional Euclidean "distance" measure.

Since the data collected by the gas turbine sensors may include a relatively large noise component, it was determined that the L-1 norm would be less sensitive to this unwanted information than the L-2 norm. For the sake of comparison, a set of calculations was also prepared using the L-2 norm. t Reference is now made to FIGS. 3 and 4, mentioned above, where these two plots illustrate the improvement in results obtained when using the L-1 norm. FIG. 3 is a plot of the results of the sparse coding process, showing a relatively large number of spikes as the L-2 residuals. In contrast, the plot of FIG. 4 (based on using the L-1 norm in accordance with the present invention) contains a much smaller number of residuals. Clearly, the L-2 norm produces more spikes, which makes the ability to detect small deviations in actual sensor readings harder to detect, where this subtle data may be more indicative of a sensor failure and more important for the purposes of the present invention.

Also for the sake of comparison, a set of results was generated that ignored the time component making the final determination of "abnormal" data. In the following table, this set of results is identified as "baseline algorithm". In the table, residuals (anomalies) are denoted by "+" and normal data as "−". The particular tabular form shows "false positives" in the form of instances where normal data was incorrectly classified as an anomaly, as well as the case where an anomaly was incorrectly classified as a normal data (using the headers "prediction" and "actual").

| | L-1 norm: Random points | | | | | |
|---|---|---|---|---|---|---|
| | Baseline Algorithm | | SVM Model Actual | | Threshold | |
| Predict | + | − | + | − | + | − |
| + | 571 | 1094 | 582 | 232 | 456 | 18 |
| − | 293 | 140254 | 282 | 141116 | 408 | 141330 |
| (point 51010) | | | | | | |
| + | 218 | 1271 | 205 | 413 | 167 | 150 |
| − | 646 | 140077 | 659 | 140935 | 697 | 141198 |
| (point 23189) | | | | | | |
| + | 279 | 1268 | 270 | 413 | 254 | 150 |
| − | 585 | 140080 | 594 | 140935 | 610 | 141198 |
| (point 89904) | | | | | | |
| + | 355 | 1278 | 345 | 413 | 247 | 150 |
| − | 509 | 140070 | 519 | 140935 | 617 | 141198 |
| (point 56385) | | | | | | |
| + | 369 | 1269 | 363 | 413 | 220 | 150 |
| − | 495 | 140079 | 501 | 140935 | 644 | 141198 |
| (point 78503) | | | | | | |

From a review of the above table, it is clear that both approaches of the present invention (the SVM model and the threshold) provide improved results (in terms of lower numbers of false-positives) when compared to the baseline approach. A more complete set of results for a total of ten random time points (including values calculated in each instance using both the L-2 and the L-1 norm) is shown in the Appendix to this specification. The complete set of results included in the Appendix further shows that in each instance the use of the L-1 norm instead of the L-2 norm provides a more accurate result, thus validating that the selection of the L-1 norm is the better operation.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are not tangible. Cached information is considered to be stored on a computer-readable medium. Common expedients of computer-readable media are well-known in the art and need not be described in detail here.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

APPENDIX

| Effect on residual; comparing L-2 norm to L-1 norm | | | | | | |
|---|---|---|---|---|---|---|
| | Random point chosen at time index 51010 | | | | | |
| L-2 norm | Baseline Algorithm | | SVM Truth | | Threshold | |
| Predict | + | − | + | − | + | − |
| + | 443 | 1130 | 431 | 499 | 462 | 64 |
| − | 421 | 140218 | 433 | 140849 | 402 | 141284 |
| Precision | 0.281627 | | 0.463441 | | 0.878327 | |
| Recall | 0.512731 | | 0.498843 | | 0.534722 | |

APPENDIX-continued

Effect on residual; comparing L-2 norm to L-1 norm

| L-1 norm | Baseline Algorithm Truth | | SVM | | Threshold | |
|---|---|---|---|---|---|---|
| Predict | + | − | + | − | + | − |
| + | 571 | 1094 | 582 | 232 | 456 | 18 |
| − | 293 | 140254 | 282 | 141116 | 408 | 141330 |
| Precision | 0.342943 | | 0.714988 | | 0.962025 | |
| Recall | 0.66088 | | 0.673611 | | 0.527778 | |

Random point chosen at time index 23189

| L-2 norm | Baseline Algorithm Truth | | SVM | | Threshold | |
|---|---|---|---|---|---|---|
| Predict | + | − | + | − | + | − |
| + | 77 | 1345 | 68 | 717 | 167 | 196 |
| − | 787 | 140003 | 796 | 140631 | 697 | 141152 |
| Precision | 0.054149 | | 0.086624 | | 0.460055 | |
| Recall | 0.08912 | | 0.078704 | | 0.193287 | |

| L-1 norm | Baseline Algorithm Truth | | SVM | | Threshold | |
|---|---|---|---|---|---|---|
| Predict | + | − | + | − | + | − |
| + | 218 | 1271 | 205 | 413 | 167 | 150 |
| − | 646 | 140077 | 659 | 140935 | 697 | 141198 |
| Precision | 0.146407 | | 0.331715 | | 0.526814 | |
| Recall | 0.252315 | | 0.237269 | | 0.193287 | |

Random point chosen at time index 76725

| L-2 norm | Baseline Algorithm Truth | | SVM | | Threshold | |
|---|---|---|---|---|---|---|
| Predict | + | − | + | − | + | − |
| + | 193 | 1337 | 177 | 719 | 224 | 196 |
| − | 671 | 140011 | 687 | 140629 | 640 | 141152 |
| Precision | 0.126144 | | 0.197545 | | 0.533333 | |
| Recall | 0.22338 | | 0.204861 | | 0.259259 | |

| L-1 norm | Baseline Algorithm Truth | | SVM | | Threshold | |
|---|---|---|---|---|---|---|
| Predict | + | − | + | − | + | − |
| + | 334 | 1264 | 317 | 413 | 224 | 150 |
| − | 530 | 140084 | 547 | 140935 | 640 | 141198 |
| Precision | 0.209011 | | 0.434247 | | 0.59893 | |
| Recall | 0.386574 | | 0.366898 | | 0.259259 | |

Random point chosen at time index 80117

| L-2 norm | Baseline Algorithm Truth | | SVM | | Threshold | |
|---|---|---|---|---|---|---|
| Predict | + | − | + | − | + | − |
| + | 181 | 1333 | 167 | 719 | 169 | 196 |
| − | 683 | 140015 | 697 | 140629 | 695 | 141152 |
| Precision | 0.119551 | | 0.188488 | | 0.463014 | |
| Recall | 0.209491 | | 0.193287 | | 0.195602 | |

| L-1 norm | Baseline Algorithm Truth | | SVM | | Threshold | |
|---|---|---|---|---|---|---|
| Predict | + | − | + | − | + | − |
| + | 369 | 1264 | 357 | 413 | 168 | 150 |
| − | 495 | 140084 | 507 | 140935 | 696 | 141198 |
| Precision | 0.225964 | | 0.463636 | | 0.528302 | |
| Recall | 0.427083 | | 0.413194 | | 0.194444 | |

APPENDIX-continued

Effect on residual; comparing L-2 norm to L-1 norm

Random point chosen at time index 89904

| L-2 norm | Baseline Algorithm Truth | | SVM | | Threshold | |
|---|---|---|---|---|---|---|
| Predict | + | − | + | − | + | − |
| + | 114 | 1336 | 94 | 719 | 257 | 196 |
| − | 750 | 140012 | 770 | 140629 | 607 | 141152 |
| Precision | 0.078621 | | 0.115621 | | 0.567329 | |
| Recall | 0.131944 | | 0.108796 | | 0.297454 | |

| L-1 norm | Baseline Algorithm Truth | | SVM | | Threshold | |
|---|---|---|---|---|---|---|
| Predict | + | − | + | − | + | − |
| + | 279 | 1268 | 270 | 413 | 254 | 150 |
| − | 585 | 140080 | 594 | 140935 | 610 | 141198 |
| Precision | 0.180349 | | 0.395315 | | 0.628713 | |
| Recall | 0.322917 | | 0.3125 | | 0.293981 | |

Random point chosen at time index 56385

| L-2 norm | Baseline Algorithm Truth | | SVM | | Threshold | |
|---|---|---|---|---|---|---|
| Predict | + | − | + | − | + | − |
| + | 178 | 1348 | 158 | 719 | 247 | 196 |
| − | 686 | 140000 | 706 | 140629 | 617 | 141152 |
| Precision | 0.116645 | | 0.18016 | | 0.557562 | |
| Recall | 0.206019 | | 0.18287 | | 0.28588 | |

| L-1 norm | Baseline Algorithm Truth | | SVM | | Threshold | |
|---|---|---|---|---|---|---|
| Predict | + | − | + | − | + | − |
| + | 355 | 1278 | 345 | 413 | 247 | 150 |
| − | 509 | 140070 | 519 | 140935 | 617 | 141198 |
| Precision | 0.217391 | | 0.455145 | | 0.622166 | |
| Recall | 0.41088 | | 0.399306 | | 0.28588 | |

Random point chosen at time index 78503

| L-2 norm | Baseline Algorithm Truth | | SVM | | Threshold | |
|---|---|---|---|---|---|---|
| Predict | + | − | + | − | + | − |
| + | 227 | 1336 | 231 | 719 | 220 | 196 |
| − | 637 | 140012 | 633 | 140629 | 644 | 141152 |
| Precision | 0.145234 | | 0.243158 | | 0.528846 | |
| Recall | 0.262731 | | 0.267631 | | 0.25463 | |

| L-1 norm | Baseline Algorithm Truth | | SVM | | Threshold | |
|---|---|---|---|---|---|---|
| Predict | + | − | + | − | + | − |
| + | 369 | 1269 | 363 | 413 | 220 | 150 |
| − | 495 | 140079 | 501 | 140935 | 644 | 141198 |
| Precision | 0.225275 | | 0.467784 | | 0.594595 | |
| Recall | 0.427083 | | 0.420139 | | 0.25463 | |

Random point chosen at time index 56711

| L-2 norm | Baseline Algorithm Truth | | SVM | | Threshold | |
|---|---|---|---|---|---|---|
| Predict | + | − | + | − | + | − |
| + | 184 | 1348 | 143 | 719 | 412 | 196 |
| − | 680 | 140000 | 721 | 140629 | 452 | 141152 |
| Precision | 0.120104 | | 0.165893 | | 0.677632 | |
| Recall | 0.212963 | | 0.165509 | | 0.476852 | |

APPENDIX-continued

Effect on residual; comparing L-2 norm to L-1 norm

| L-1 norm | Baseline Algorithm | | SVM Truth | | Threshold | |
|---|---|---|---|---|---|---|
| Predict | + | − | + | − | + | − |
| + | 406 | 1277 | 408 | 413 | 412 | 150 |
| − | 458 | 140071 | 456 | 140935 | 452 | 141198 |
| Precision | 0.241236 | | 0.496955 | | 0.733096 | |
| Recall | 0.469907 | | 0.472222 | | 0.476852 | |

Random point chosen at time index 31449

| L-2 norm | Baseline Algorithm | | SVM Truth | | Threshold | |
|---|---|---|---|---|---|---|
| Predict | + | − | + | − | + | − |
| + | 129 | 1348 | 117 | 719 | 238 | 196 |
| − | 735 | 140000 | 747 | 140629 | 626 | 141152 |
| Precision | 0.087339 | | 0.139952 | | 0.548387 | |
| Recall | 0.149306 | | 0.135417 | | 0.275463 | |

| L-1 norm | Baseline Algorithm | | SVM Truth | | Threshold | |
|---|---|---|---|---|---|---|
| Predict | + | − | + | − | + | − |
| + | 253 | 1278 | 237 | 413 | 238 | 150 |
| − | 611 | 140070 | 627 | 140935 | 626 | 141198 |
| Precision | 0.165251 | | 0.364615 | | 0.613402 | |
| Recall | 0.292824 | | 0.274306 | | 0.275463 | |

Random point chosen at time index 102457

| L-2 norm | Baseline Algorithm | | SVM Truth | | Threshold | |
|---|---|---|---|---|---|---|
| Predict | + | − | + | − | + | − |
| + | 194 | 1343 | 180 | 719 | 229 | 196 |
| − | 670 | 140005 | 684 | 140629 | 635 | 141152 |
| Precision | 0.12622 | | 0.200222 | | 0.538824 | |
| Recall | 0.224537 | | 0.208333 | | 0.265046 | |

| L-1 norm | Baseline Algorithm | | SVM Truth | | Threshold | |
|---|---|---|---|---|---|---|
| Predict | + | − | + | − | + | − |
| + | 349 | 1270 | 343 | 413 | 229 | 150 |
| − | 515 | 140078 | 521 | 140935 | 635 | 141198 |
| Precision | 0.215565 | | 0.453704 | | 0.604222 | |
| Recall | 0.403935 | | 0.396991 | | 0.265046 | |

What is claimed is:

1. A method for detecting gas turbine sensor failure based upon collected readings from at least one sensor, comprising:
creating a dictionary of basis vectors defining values associated with known sensor readings for normal operating conditions;
applying a sparse coding process to a set of sensor reading data, using the created dictionary, to identify a set of L-1 norm residual data;
evaluating the L-1 norm residual data to categorize a predetermined subset of the largest-valued L-1 norm residual data as abnormal sensor readings;
comparing the abnormal sensor readings to a plurality of prior sensor readings and defining the designated abnormal sensor readings as associated with a sensor failure if a predefined number of the prior sensor readings are also designated as abnormal sensor readings;
transmitting a sensor failure signal to gas turbine personnel, identifying the particular sensor; and
removing the failed sensor from service, and repairing or replacing the failed sensor.

2. The method as defined in claim 1 wherein in creating the dictionary the following steps are performed:
organizing the sensor reading data into a plurality of clusters;
using a k-means algorithm, determining a center of each cluster; and
initializing the dictionary with the determined center of each cluster.

3. The method as defined in claim 1 wherein the sparse coding process performs the relation:

$\min_{E,X} \|Y-DX-E\|_F^2 + \alpha\|X\|_{1,2} + \beta\|E\|_{1,1}$, where D is the created dictionary, X is the plurality of sensor readings, E is the L-1 norm residuals, and $\alpha$ and $\beta$ are small positive scalars.

4. The method as defined in claim 3 wherein the minimization function performs the following iterative steps:
a.
$X^{k+1} = \operatorname{argmin}_X L(X, Z^k, E^k, M^k, \mu^k) = (D^T D + \mu^k I)^{-1}(D^T(Y-E^k) + M^k + \mu^k Z^k)$, where L is the Augmented-Lagrangian and is defined as follows:

$$L(X, Z, E, M, \mu) = \frac{1}{2}\|Y - DX - E\|_F^2 + \alpha\|Z\|_{1,2} + \beta\|Z\|_{1,1} + \langle M, Z - X \rangle + \frac{\mu}{2}\|Z - X\|_F^2$$

b. $Z^{k+1} = \operatorname{argmin}_X L(X^{k+1}, Z, E^k, M^k, \mu^k) = \operatorname{argmin}_Z \frac{1}{2}\|P - Z\|_F^2 + \gamma\|Z\|_{1,2}$, where $$P = X^{k+1} - \frac{1}{\mu^k},$$

using the row shrinkage operator:

$$Z^{k+1}(j, :) = \begin{cases} \frac{\|P(j, :)\|_2 - \gamma}{\|P(j, :)\|_2} P(j, :) & \text{if } \gamma < \|(j, :)\|_2 \\ 0 & \text{otherwise} \end{cases}$$

c. $E^{k+1} = \operatorname{argmin}_E L(X^{k+1}, Z^{k+1}, E, M^k, \mu^k) = \operatorname{argmin}_Z \frac{1}{2}\|Q - E\|_F^2 + \beta\|E\|_{1,1}$, where $Q = Y - DX^{k+1}$ and $E^{k+1} = S_\beta(Q)$, where $$S_\beta(a) = \begin{cases} a - \beta & \text{if } a > \beta \\ 0 & \text{if } |a| \leq \beta \\ a + \beta & \text{if } a < -\beta \end{cases}$$

d. $M^{k+1} = M^k + \mu^k(Z^{k+1} - X^{k+1})$
e. $\mu^{k+1} = \rho\mu^k$
f. $k = k+1$
g. Stop if:

$$\frac{\|z^k - x^k\|_F^2}{\|x^k\|_F^2} < \epsilon,$$

where $E^k$ is defined as a set of L-1 normal residual data, Z is an auxiliary variable, M is a Lagrange multiplier, $\mu$ is a penalty coefficient, $\rho$ is a parameter for updating $\mu$ and $\epsilon$ is an error tolerance used to measure the closeness of Z to X so as to terminate the algorithm.

5. The method as defined in claim 1 wherein in performing the evaluation step, a one-class Support Vector Machine model is created and each residual is classified as being in the class or outside of the class, the L-1 norm residuals outside of the class defined as abnormal sensor readings.

6. The method as defined in claim 5 wherein the set of L-1 norm residual data is sampled to reduce the size of the data set prior to creating the one-class SVM model.

7. The method as defined in claim 5 wherein in performing the comparing step the plurality of prior time step data is reviewed and if a first high percentage p % of the plurality of prior time step data is also designated as an abnormal sensor reading, a sensor failure determination is made.

8. The method as defined in claim 7 wherein the value of p is at least equal to 50.

9. The method as defined in claim 1 wherein the L-1 norm residual data is evaluated by defining a threshold percentage and defining as abnormal sensor reading data all values exceeding the defined threshold.

10. The method as defined in claim 9 wherein in performing the comparing step the plurality of prior time step data is reviewed and if a second high percentage q % of the plurality of prior time step data is also designated as an abnormal sensor reading, a sensor failure determination is made.

11. A system for detecting failure of a gas turbine sensor comprising
a database of sensor readings;
a sensor monitoring system component in communication with the database of sensor readings, the sensor monitoring system component comprising a program storage device and a processor, the program storage device embodying in a fixed tangible medium a set of program instructions executable by the processor to perform the method steps of:
creating a dictionary of basis vectors defining values associated with known sensor readings for normal operating conditions;
applying a sparse coding process to a set of sensor reading data, using the created dictionary, to identify a set of L-1 norm residual data;
evaluating the L-1 norm residual data to categorize a predetermined subset of the largest-valued L-1 norm residual data as abnormal sensor readings;
comparing the abnormal sensor readings to a plurality of prior sensor readings and defining the designated abnormal sensor readings as associated with a sensor failure if a predefined number of the prior sensor readings are also designated as abnormal sensor readings; and
transmitting a sensor failure signal to gas turbine personnel, including information identifying the failed sensor, so as to be repaired or replaced;
a monitoring system database for storing sensor readings classified as abnormal.

12. The system of claim 11 wherein the executable program instructions, when executed by the processor, further instruct the processor to perform the step of creating a dictionary of basis vectors by:
organizing the sensor reading data into a plurality of clusters;
using a k-means algorithm, determining a center of each cluster; and
initializing the dictionary with the determined center of each cluster.

13. The system of claim 11 wherein the executable program instructions, when executed by the processor, further instruct the processor to perform the step of applying a sparse coding process by:

$$\min_{E,X} \|Y-DX-E\|_F^2 + \alpha\|X\|_{1,2} + \beta\|E\|_{1,1},$$

where D is the created dictionary, X is the plurality of sensor readings, E is the L-1 norm residuals, and $\alpha$ and $\beta$ are small positive scalars.

14. The system of claim 13 wherein the executable program instructions, when executed by the processor, further instruct the processor to performing the sparse coding residual detection minimization by performing the following iteration:

a.
$$X^{k+1} = \operatorname{argmin}_X L(X,Z^k,E^k,M^k,\mu^k) = (D^TD+\mu^kI)^{-1}(D^T(Y-E^k)+M^k+\mu^k Z^k),$$

where L is the Augmented-Lagrangian and is defined as follows:

$$L(X, Z, E, M, \mu) =$$
$$\frac{1}{2}\|Y - DX - E\|_F^2 + \alpha\|Z\|_{1,2} + \beta\|Z\|_{1,1} + \langle M, Z - X \rangle + \frac{\mu}{2}\|Z - X\|_F^2$$

b. $Z^{k+1} = \operatorname{argmin}_X L(X^{k+1},Z,E^k,M^k,\mu^k) = \operatorname{argmin}_Z \frac{1}{2}\|P-Z\|_F^2 + \gamma\|Z\|_{1,2}$, where $$P = X^{k+1} - \frac{1}{\mu^k},$$

using the row shrinkage operator:

$$Z^{k+1}(j, :) = \begin{cases} \frac{\|P(j, :)\|_2 - \gamma}{\|P(j,:)\|_2} P(j, :) & \text{if } \gamma < \|(j, :)\|_2 \\ 0 & \text{otherwise} \end{cases}$$

c. $E^{k+1} = \operatorname{argmin}_E L(X^{k+1},Z^{k+1},E,M^k,\mu^k) = \operatorname{argmin}_Z \frac{1}{2}\|Q-E\|_F^2 + \beta\|E\|_{1,1}$, where $Q=Y-DX^{k+1}$ and $E^{k+1}=S_\beta(Q)$, where $$S_\beta(a) = \begin{cases} a - \beta & \text{if } a > \beta \\ 0 & \text{if } |a| \le \beta \\ a + \beta & \text{if } a < -\beta \end{cases}$$

d. $M^{k+1} = M^k + \mu^k(Z^{k+1} - X^{k+1})$
e. $\mu^{k+1} = \rho\mu^k$
f. k=k+1
g. Stop if:

$$\frac{\|Z^k - X^k\|_F^2}{\|X^k\|_F^2} < \epsilon,$$

where $E^k$ is defined as a set of L-1 normal residual data, Z is an auxiliary variable, M is a Lagrange multiplier, $\mu$ is a penalty coefficient, ρ is a parameter for updating μ and ϵ is an error tolerance used to measure the closeness of Z to X so as to terminate the algorithm.

15. The system of claim 11 wherein the executable program instructions, when executed by the processor, further instruct the processor to create a one-class Support Vector Machine model in the evaluating step, with each L-1 norm residual is classified as being in the class or outside of the class, the L-1 norm residuals outside of the created class defined as abnormal sensor readings.

16. The system of claim 15 wherein the executable program instructions, when executed by the processor, further instruct the processor to perform the comparing step by reviewing the plurality of prior time step data and if a first high percentage p % of the plurality of prior time step data is also designated as an abnormal sensor reading, a sensor failure determination is made.

17. The system of claim 11 wherein the executable program instructions, when executed by the processor, further instruct the processor to perform the step of evaluating the L-1 norm residuals by defining a threshold percentage and defining as abnormal sensor reading data all values exceeding the defined threshold.

18. The system of claim 17 wherein the executable program instructions, when executed by the processor, further instruct the processor to perform the comparing step by the plurality of prior time step data is reviewed and if a second high performance q % of the plurality of prior time step data is also designated as an abnormal sensor reading, a sensor failure determination is made.

19. A method for predicting failure of a gas turbine sensor based upon collected readings from at least one sensor, comprising:

creating a dictionary of basis vectors defining values associated with known sensor readings for normal operating conditions;

applying a sparse coding process to a set of sensor reading data, using the created dictionary, to identify a set of L-1 norm residual data;

evaluating the L-1 norm residual data to categorize a predetermined subset of the largest-valued L-1 norm residual data as abnormal sensor readings;

comparing the abnormal sensor readings to a plurality of prior sensor readings and defining the designated abnormal sensor readings as associated with a predicted sensor failure if a predefined number of the prior sensor readings are also designated as abnormal sensor readings; and transmitting a message to gas turbine personnel identifying a sensor for potential repair or replacement.

20. The method for predicting failure of a gas turbine sensor as defined in claim 19, wherein the sparse coding process performs the relation:

$$\min_{E,X} \|Y-DX-E\|_F^2 + \alpha\|X\|_{1,2} + \beta\|E\|_{1,1},$$

where D is the created dictionary, X is the plurality of sensor readings, E is the L-1 norm residuals, and α and β are small positive scalars.

* * * * *